US011691545B2

(12) United States Patent  
Macliver

(10) Patent No.: US 11,691,545 B2  
(45) Date of Patent: Jul. 4, 2023

(54) CHILD SAFETY SEAT

(71) Applicant: Kevin Scott Macliver, Birmingham (GB)

(72) Inventor: Kevin Scott Macliver, Birmingham (GB)

(*) Notice: Subject to any disclaimer, the term of this patent is extended or adjusted under 35 U.S.C. 154(b) by 66 days.

(21) Appl. No.: 17/509,532

(22) Filed: Oct. 25, 2021

(65) Prior Publication Data

US 2022/0048416 A1 Feb. 17, 2022

Related U.S. Application Data

(63) Continuation of application No. 16/633,021, filed as application No. PCT/GB2018/052072 on Jul. 23, 2018, now Pat. No. 11,161,434.

(30) Foreign Application Priority Data

Jul. 24, 2017 (GB) .................................. 1711861

(51) Int. Cl.
*B60N 2/28* (2006.01)
*B60N 2/56* (2006.01)

(52) U.S. Cl.
CPC ......... *B60N 2/2884* (2013.01); *B60N 2/2875* (2013.01); *B60N 2/56* (2013.01); *B60N 2/28* (2013.01); *B60N 2/286* (2013.01); *B60N 2/2824* (2013.01); *B60N 2/2863* (2013.01)

(58) Field of Classification Search
CPC .. B60N 2/2884; B60N 2/2875; B60N 2/2863; B60N 2/28; B60N 2/2824; B60N 2/286
See application file for complete search history.

(56) References Cited

U.S. PATENT DOCUMENTS

| 3,645,548 | A | | 2/1972 | Briner | |
|---|---|---|---|---|---|
| 4,113,306 | A | * | 9/1978 | von Wimmersperg | ..................... B60N 2/2845 280/30 |
| 4,480,870 | A | * | 11/1984 | von Wimmersperg | ..................... B60N 2/2863 297/256.13 |
| 5,722,719 | A | | 3/1998 | Glomstad | |
| 7,219,958 | B2 | * | 5/2007 | Yamazaki | ............ B60N 2/2806 297/256.13 |

(Continued)

FOREIGN PATENT DOCUMENTS

DE 4405147 8/1995
EP 1300280 4/2003

(Continued)

OTHER PUBLICATIONS

Examination Report under Section 18(3) dated Aug. 25, 2022 for corresponding Great Britain Application No. GB1711861.3.

(Continued)

*Primary Examiner* — Syed A Islam
(74) *Attorney, Agent, or Firm* — Caesar Rivise, PC

(57) ABSTRACT

A child safety seat (1) for a vehicle, the child safety seat (1) comprises a seat body (2) and a frame (3) which is removably secured to or securable onto an existing vehicle seat (VS) in a rearward configuration, the seat body (2) comprising a back portion (20) and a seat portion (21), the frame (3) being pivotably attached to the back portion (20) of the seat body (2) such that, in use, the seat body (2) is arranged to pivot about the pivotable attachment to the frame (3) during a vehicular accident.

20 Claims, 6 Drawing Sheets

(56) References Cited

U.S. PATENT DOCUMENTS

| | | |
|---|---|---|
| 8,864,229 B2 | 10/2014 | Rajasingham |
| 9,315,123 B2 | 4/2016 | Guo |
| 9,789,791 B2 | 10/2017 | Hutchinson et al. |
| 2004/0041448 A1 | 3/2004 | Takizawa |
| 2004/0232747 A1 | 11/2004 | Yamazaki et al. |
| 2014/0353953 A1 | 12/2014 | Jiang et al. |
| 2015/0115669 A1 | 4/2015 | Kagan et al. |
| 2021/0129718 A1* | 5/2021 | Hunsaker ............... B60N 2/26 |

FOREIGN PATENT DOCUMENTS

| | | |
|---|---|---|
| WO | 9825789 | 6/1998 |
| WO | WO98/46448 A1 | 10/1998 |

OTHER PUBLICATIONS

Examination Report under Section 18(3) dated Jan. 25, 2022 for corresponding Great Britain Application No. GB1711861.3.
Search Report under Section 17(5) dated Jan. 18, 2018 based on Application No. GB1711861.3.
International Search for corresponding PCT Application International Application No. PCT/GB2018/052072 dated Oct. 31, 2018.

* cited by examiner

CHILD SAFETY SEAT

CROSS-REFERENCE TO RELATED APPLICATIONS

This Continuation application claims the benefit under 35 U.S.C. § 120 of application Ser. No. 16/633,021 filed on Jan. 22, 2020 which in turn is a U.S. National Phase Application and claims the benefit under 35 U.S.C. § 371 of PCT/GB2018/052072, filed Jul. 23, 2018 which claims priority to GB 1711861.3, filed Jul. 24, 2017, the contents of which applications are all incorporated by reference herein in their entireties for all purposes.

BACKGROUND OF THE INVENTION

This invention relates generally to a child safety seat. More specifically, although not exclusively, this invention relates to a child safety seat for a vehicle.

In many jurisdictions it is a legal requirement for children under a certain height and/or weight to be seated in rear-facing child safety seat when in a moving automobile. For example, in the UK children up to the age of 15 months old or weighing 11 kg (whichever occurs first) must be seated in rear-facing child safety seats.

Furthermore, in many jurisdictions, child safety seats must pass stringent safety tests before they are certified for sale. For example, in the EU, during testing of a rear-facing child safety seat not supported by the dashboard, the head of a crash test dummy located therein must not move beyond a distance of 700 mm from the seat upon which the rear-facing child safety seat is secured. Moreover, the crash test dummy must not be subjected to greater than 55 G chest deceleration.

It has been found that prior art rear-facing child safety seats are often unsuited to seat children beyond the age of 18 months old and/or fail the above-described EU safety testing. This is because prior art child safety seats are too small to seat children beyond the age of 18 months old or, in the alternative, the child safety seats move during impact testing such that the head of the crash test dummy is beyond the 700 mm limit.

Child safety seats suitable for older children should be relatively larger than child safety seats suitable for younger children. Moreover, children older than 2 years old typically have a greater mass than do children under the age of 15 months. Accordingly, during a vehicular accident, the forces applied to child safety seats are typically relatively greater when occupied by an older (and hence heavier) child. The displacement of prior art child safety seats is hence relatively increased during vehicular accidents when occupied by relatively older children.

Meanwhile, in the event of a vehicular accident, a proportion of the energy of the accident is transmitted to the occupant of the child safety seat. However, the proportion transmitted to the occupant of the child safety seat must not generate chest decelerations exceeding 55 G, otherwise the child safety seat will fail the above-described EU tests.

Moreover, child safety seats for babies should be appropriately inclined to the seating area of the vehicle such that the baby is not too upright. Seats which are too upright may negatively impact on the breathing of the baby. Furthermore, seats which are too upright are uncomfortable for children which may lead to non-compliance with use of the seat and/or an unhappy child.

Furthermore, child safety seats are typically expensive and therefore purchasing one or more replacement child safety seats as a child grows (and hence outgrows one or more child safety seats) is costly.

BRIEF SUMMARY OF THE INVENTION

It is therefore a first non-exclusive object of the invention to provide a child safety seat which mitigates one or more of the above identified problems. It is a further non-exclusive object of the invention to provide a child safety seat suitable for children up to the age of 18 months or weighing up to 13 kg (whichever occurs first) which will pass the above-described safety test requirements. It is a further non-exclusive object of the invention to provide a child safety seat suitable for older children and preferably one which will pass the above-described safety test requirements.

Accordingly, a first aspect of the invention provides a child safety seat for a vehicle, the child safety seat comprising a seat body and a frame which is removably secured or securable onto an existing vehicle seat in a rearward configuration, the seat body comprising a back portion and a seat portion, the frame being pivotably attached to the back portion of the seat body such that, in use, the seat body is arranged to pivot about the pivotable attachment to the frame during a vehicular accident.

The invention thus provides a child safety seat which is capable of seating a child aged up to 4 years old whilst also satisfying the above-described EU safety tests. The child safety seat may be sized appropriately to seat a child up to the age of 4 years old whilst ensuring that the head of a child occupant of the child safety seat does not move beyond 700 mm from a vehicle seat upon which the child safety seat is secured and/or the child occupant is not exposed to chest decelerations exceeding 55 G during a vehicular accident.

The back portion may have a proximal edge at which the back portion is attached to the seat portion and a distal or terminal edge. The frame may be pivotably attached, in use, to the back portion at a location between the proximal edge and the distal edge. The frame may be pivotably attached to the back portion at a location towards the distal edge, for example in the upper half of the back portion. The frame may be pivotably attached to the back portion at a location proximate or adjacent the terminal edge. The frame may be pivotably attached to the seat body at a location above, in use, the centre of gravity of the seat body and a child occupant thereof.

The frame may be pivotably attached to the seat body by a hinge. The hinge may comprise a recess in the frame or seat body, for example and a projection on the other of the frame and seat body, (e.g. where the projection may be configured to pivotably engage the recess).

The child safety seat may comprise an energy absorbing means or device, for example located, in use, between the seat body and the frame. The energy absorbing means or device may be located between the seat base and a base portion of the frame. The energy absorbing means or device may be configured to collapse or deform in a controlled manner when the child safety seat is secured onto an existing seat of a vehicle and the vehicle is involved in an accident. The energy absorbing means or device may comprise a device or material which is configured to collapse or deform in a controlled manner when subjected to impact loads in excess of a predetermined value.

The seat body may be attached to the frame by or through the energy absorbing means or device. The energy absorbing means or device may comprise an energy absorbing structure, for example a collapsible structure. The energy absorbing means or device may comprise cells defined by plural walls. The energy absorbing means or device may comprise a honeycomb structure, for example which may comprise a metal (e.g. aluminium or steel or the like) or polymeric material. Alternatively the energy absorbing means or device may comprise a piston or other telescopic body.

The frame may comprise securement means or securement(s) for securing the frame to the seat of the vehicle and/or the vehicle. The securement means or securement(s) may comprise a leg, for example configured or configurable to bear, in use, against a surface of the vehicle beneath and/or in front of the vehicle seat upon which the child safety seat is positioned. The leg may comprise an energy absorbing means or device. The leg may comprise a hollow elongate member. The energy absorbing means or device may be located or locatable within the leg, e.g. within the hollow elongate member. The leg may comprise a foot, for example configured to engage, in use, a surface (e.g. a floor) of the vehicle in front of and/or beneath the vehicle seat upon which the child safety seat is secured. The leg may comprise a length altering means or mechanism, for example for increasing and/or decreasing the length of the leg. The leg may comprise a biasing means or biaser, e.g. configured to bias the leg toward a relatively longer condition.

The securement means or securement(s) may comprise a securement member, e.g. configured to engage a slot of the vehicle seat and/or of a rigid structure secured to the vehicle seat. The child safety seat may be secured or securable to the rigid structure (where provided). The securement member may comprise part of an ISOFIX mechanism.

The frame may comprise an upstanding portion and a base portion. The base portion may extend, in use, along the vehicle seat. The upstanding portion may comprise at least a portion of the hinge attachment for the seat. The said at least portion of the hinge attachment may be located at or adjacent the terminal edge of the back portion of the frame.

The child safety seat may comprise size altering means or mechanism, for example configured or configurable to modify the child safety seat from a first condition in which the child safety seat is suitable for use by a baby less than 1 year old to a second condition in which the child safety seat is suitable for use by, say, a child which is 2, 3 or 4 years old.

The size altering means or mechanism may comprise one or more expandable bodies, for example operable, in use, to alter the shape of the seat body.

The seat body may have a seating area/surface for seating a child, in use. The, one, some or each expandable body may be expandable and/or contractible, in use, to alter the size of the seating area. Expansion in this context may comprise inflation. Contraction in this context may comprise deflation. The, one, some or each of the one or more expandable bodies may be expandable and/or contractible, in use, to alter the width of the seating area. The, one, some or each of the one or more expandable bodies may be expandable and/or contractible, in use, to alter the length of the seating area. The, one, some or each of the one or more expandable bodies may be expandable and/or contractible, in use, to alter the profile of the seating area.

The expandable bodies may be arranged to actuate in the event of the detection of a vehicular accident.

The size altering means or mechanism may comprise an angle altering means or mechanism, for example operable to alter the angle by which the seat portion of the seat body extends relative to the frame. The angle altering means or mechanism may comprise a displacement device (e.g. a linear or angular displacement device), for example configured or configurable to displace the seat body (e.g. the seat portion of the seat body) relative to the frame, in use. The displacement device may be configured or configurable to alter the angle of the seat body (e.g. the seat portion of the seat body) relative to the frame. The displacement device may be configured or configurable or operated or operable to alter the distance between a terminal edge of the seat portion of the seat body and the frame, e.g. of a base portion of the frame. The displacement device may be automatically or manually operated or operable. The displacement device may comprise a retractable or collapsible and/or extendable or expandable member. The displacement device may comprise a thread or screw and/or a nut. Retraction or collapse and/or extension or expansion of the retractable or collapsible and/or extendable or expandable member may be driven, e.g. by a driving means (for example a powered driving means). The driving means may comprise a motor.

The seat body may be formed from a polymer. The seat body may comprise a unitary structure, for example the seat portion and the back portion may be integrally formed. The seat body may comprise a clam-shell construction. The seat body may be formed by injection moulding, or by any other suitable method of manufacture.

The frame may be formed, at least partially, from metal, for example aluminium, steel, or the like. The frame may be formed by pressing or moulding or by any other suitable method of manufacture.

The child safety seat may comprise a control unit, for example configured or configurable to control the size altering means or mechanism (where provided). The control unit may be operably to control expansion and/or contraction of the, one, some or each expandable body. The control unit may be programmed or programmable to control the size altering means or mechanism.

The child safety seat may comprise an expansion means or mechanism, for example an inflation means or mechanism. The expansion means or mechanism may be operably connected to the, one, some or each expandable body. The expansion means or mechanism may be operable to expand and/or collapse the, one, some or each expandable body. The expansion means or mechanism may comprise a pump, for example which may be an air pump. The expansion means or mechanism may be electrically driven or drivable and/or manually driven or drivable.

The child safety seat may comprise a heating system, for example one or more heating elements. The heating system may be located or locatable in or on the seat body. The seat body may be upholstered and/or may comprise a safety harness.

The child safety seat (e.g. the control unit, where provided, and/or the expansion means or mechanism, where provided, and/or the angle altering means or mechanism, where provided, and/or the heating system, where provided) may be connected or connectable to a source of electricity. The connection may comprise a plug for connection to a vehicle's source of electricity, for example cigarette lighter plug or the like.

For the avoidance of doubt, any of the features described herein apply equally to any aspect of the invention.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one aspect or embodiment of the invention are applicable to all aspects or embodiments, unless such features are incompatible.

BRIEF DESCRIPTION OF SEVERAL VIEWS OF THE DRAWINGS

Embodiments of the invention will now be described by way of example only with reference to the accompanying drawings in which.

DETAILED DESCRIPTION OF THE PREFERRED EMBODIMENTS

Figure 1:
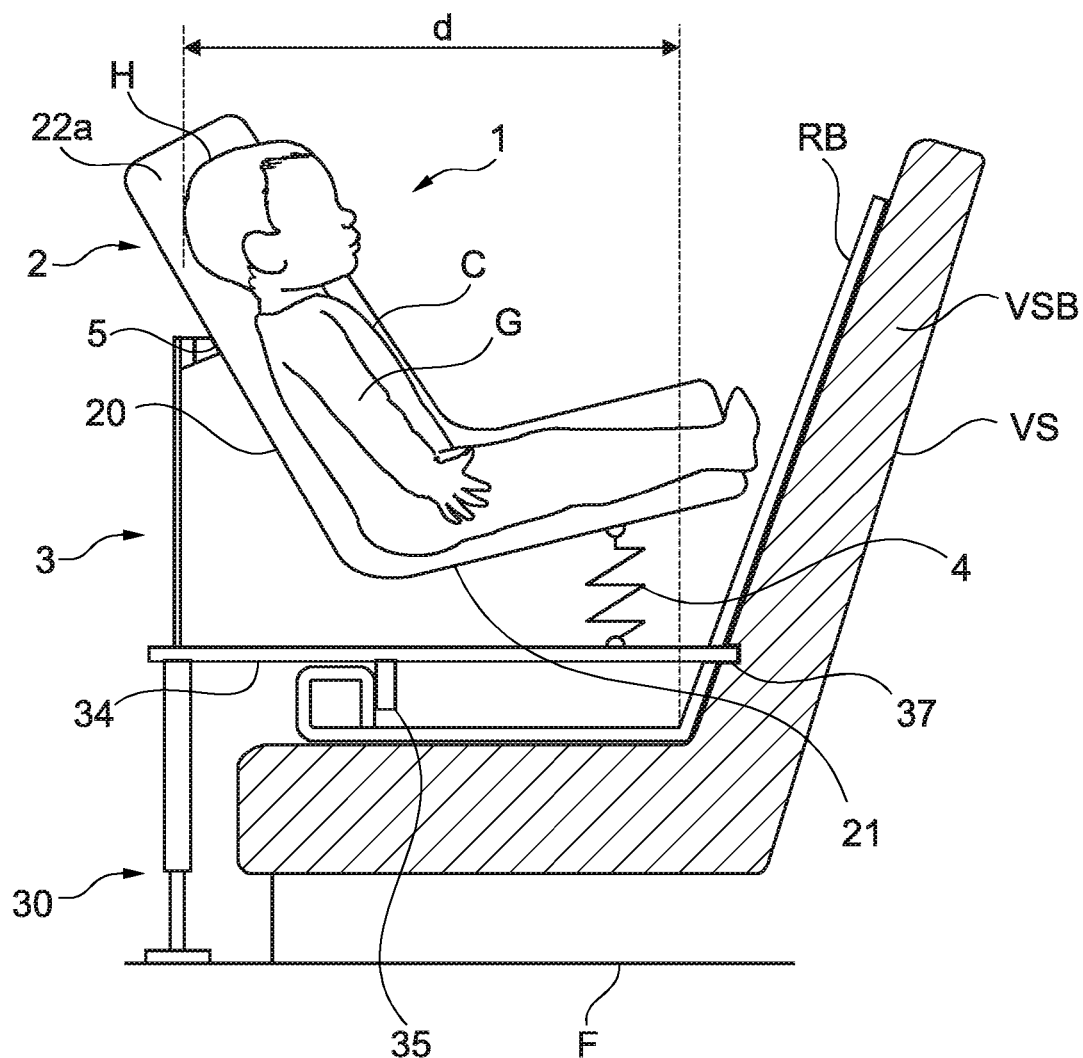
FIG. 1 is a sectional side view of a child safety seat according to a first embodiment of the invention installed on a vehicle seat and occupied by a child, where the child safety seat is shown in a first condition.

Referring now to FIG. 1, there is shown a child safety seat 1 according to a first embodiment of the invention installed on a vehicle seat VS and occupied by a child C. The child safety seat 1 is shown in FIG. 1 in a first 'normal' condition, which is a nominal condition of the child safety seat 1 being mounted in a vehicle in a rearward configuration and prior to being subject to a vehicular accident.

Figure 2:
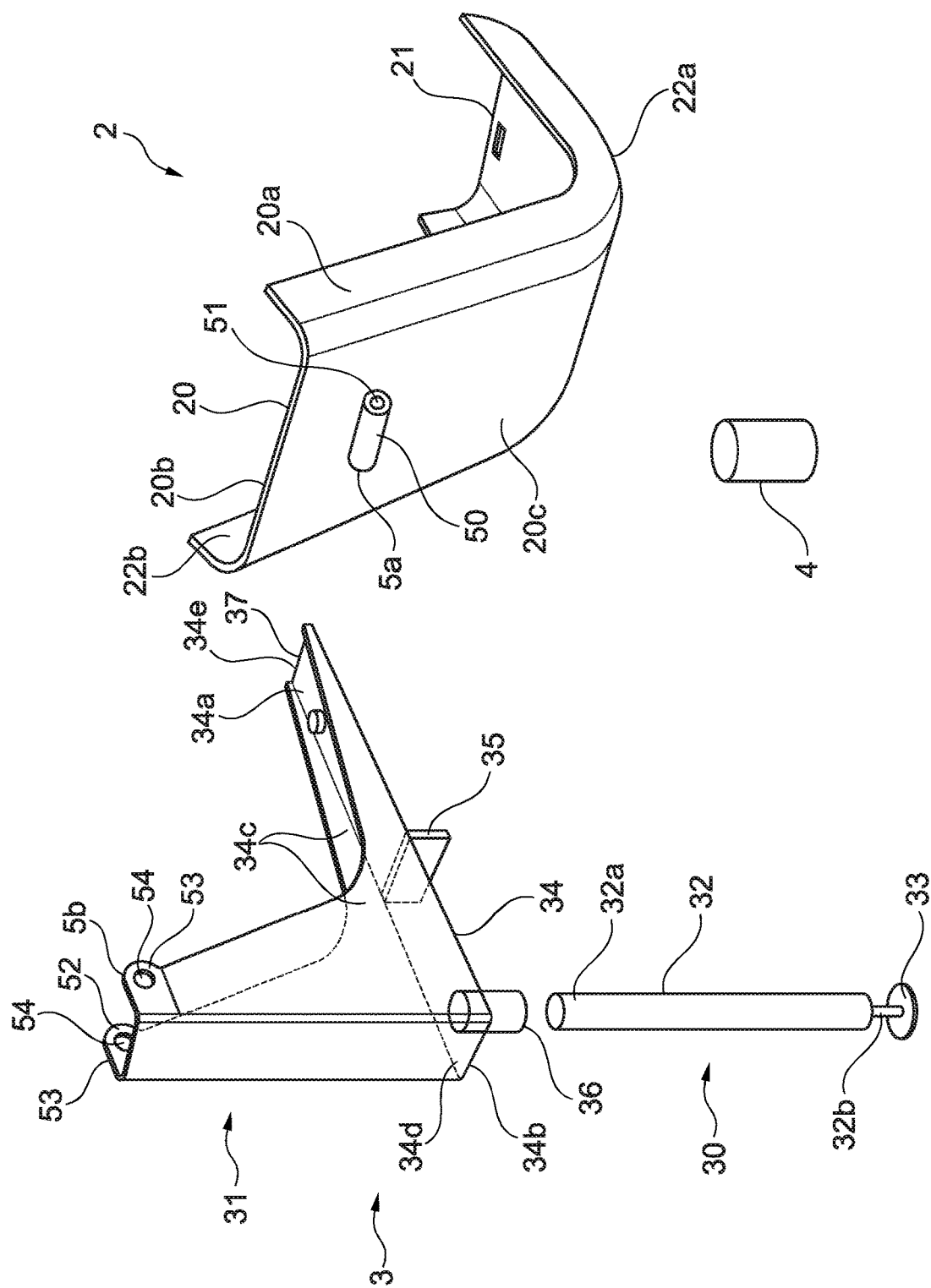
FIG. 2 is an exploded perspective view of the components of the child safety seat shown in FIG. 1.

Referring also to FIG. 2, the child safety seat 1 comprises a seat body 2, a frame 3 and an energy absorbing device 4.

The seat body 2 comprises a back portion 20, a seat portion 21 and a pair of opposed side portions 22a, 22b, which together provide a recess in which the child C is seated. The seat body 2 typically comprises a seat shell. The seat body 2 is typically upholstered with cushioning material such as foam or sponge material and a cover layer (not shown). The back portion 20 of the seat body 2 comprises a hinge 5 having a first hinge portion 5a, which is disposed in an upper portion 20a of the back portion 20 and spaced from a terminal edge 20b thereof. The side portions 22a, 22b extend from the terminal edge 20b of the back portion 20 to a terminal edge 21a of the seat portion 21.

The frame 3 comprises a leg 30 and a support portion 31.

The leg 30 comprises an elongate support member 32 having a first, connection, end 32a and a second, support, end 32b. The first, connection, end 32a is configured to attach to the support portion 32 (as will be described further below). The second, support, end 32b comprises a foot 33 for engaging, in use, a floor F of the vehicle in front of the seat VS upon which the child safety seat 1 is secured. The foot 33 is adjustable relative to the support member 32, by way of threaded attachment thereto, such that the length of the leg 30 can be adjusted.

The support portion 31 comprises a base plate 34 having a first major surface 34a and a second, obverse, major surface 34b. Side walls 34c extend from opposed edges of the base plate 34, such that the side walls 34c are parallel and opposed to one another. The side walls 34c include a top edge which is shaped to accommodate/receive the seat portion 21 and back portion 20 of the seat body 2. The side walls 34c comprise a second hinge portion 5b adjacent their terminal edge.

An abutment 35 is provided on the base plate 34, projecting from its second major surface 34b. A socket 36 extends from the second major surface 34b of the base plate 34, adjacent a first end thereof 34d. A securement member 37 extends from the base plate 34, from a second end 34e thereof, which is opposite to the first end 34d.

The first hinge portion 5a comprises a projection 50 from the obverse surface of the back portion 20 to the surface which is occupied by a child, in use. The projection 50 comprises an axial passageway 51 extending therethrough.

The second hinge portion 5b comprises a recess 52 defined between a pair of support ends 53, which extend from distal portions of the side walls 34c. Aligned apertures 54 are provided through the support ends 53. The recess 52 is configured to receive the projection 50 such that the axial passageway 51 is aligned with each of the apertures 54. Prior to use, a pin (not shown) is secured through the aligned projection 50 and recess 52 such that a hinge 5 is formed. The seat body 2 is thus hingedly attached to the frame 3.

The energy absorbing device 4 comprises an energy absorbing structure that, in the event of an accident, absorbs energy. In this embodiment the energy absorbing structure is made from a honeycomb-like material which is able to absorb compressive impacts. One suitable material is manufactured by Cellbond Composites Ltd of Huntingdon UK called Hyload®, others are sold as Pressload® or Hyimpact®. Additionally or alternatively, in embodiments, the energy absorbing structure may be formed from other materials such as foams or other polymeric materials. In embodiments we prefer materials which plastically deform in the event of a vehicular impact. The energy absorbing device 4 may also be, for example, a piston which telescopically collapses when impacted or other device that can use the energy to do work.

Prior to installation of the child safety seat 1 at a site of use the seat body 2 is hingedly attached to the frame 3 by forming the hinge 5 (as described above). The energy absorbing device 4 is disposed between the base plate 34 of the frame 3 and the seat portion 21 of the seat body 2. The leg 30 is attached to the support portion 31 by engaging the first, connection, end 32a of the support member 32 into the socket 36 of the support portion 31. Alternatively, the socket 36 may be at the connection end 32 and the frame may include an protrusion to engage the socket 36. In embodiments, the leg 30 is configured to be removably attached to the support portion 31, for example by push fit or screw fit. However, in embodiments the leg 30 and support portion 31 may be permanently secured together.

Figure 9:
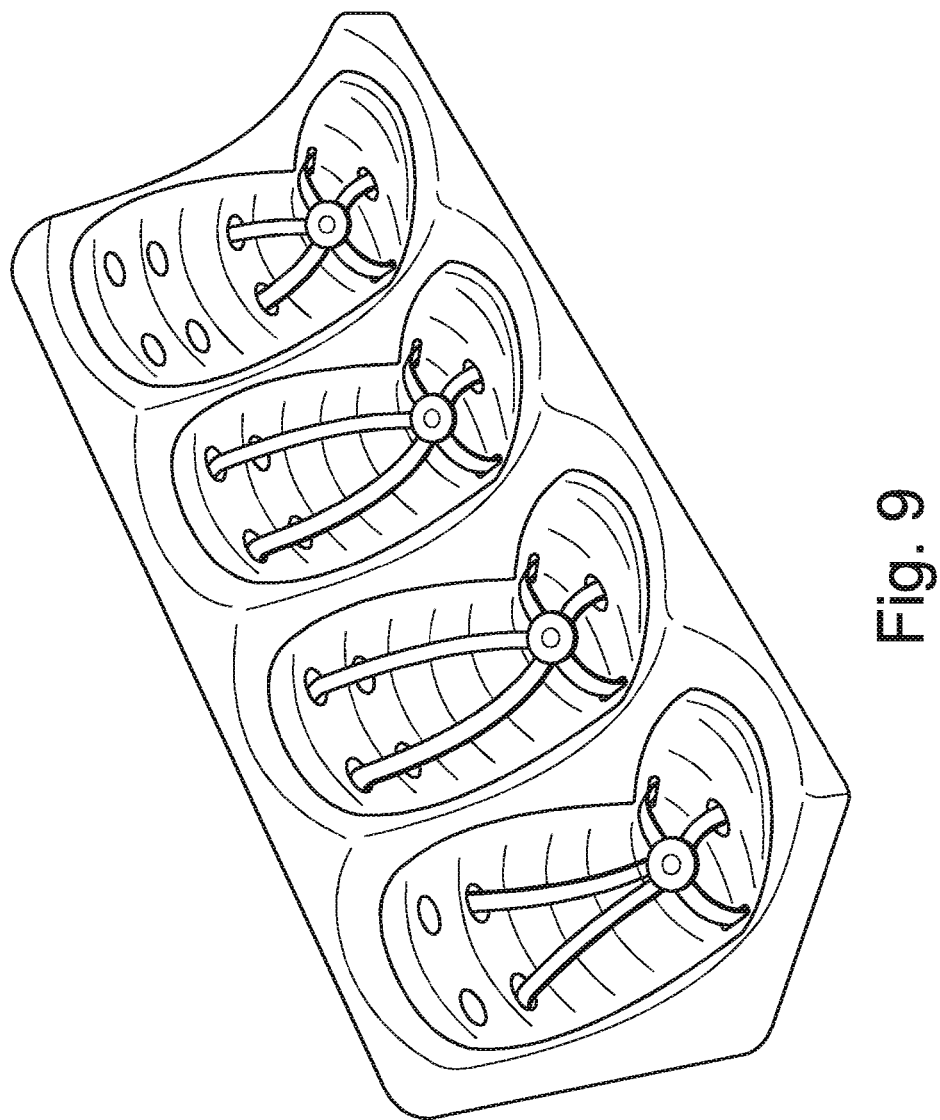
FIG. 9 is a perspective view of a prior art multiple occupancy child seat.

In this embodiment, the frame 3 is configured to engage with, and be secured to, a rigid body RB previously secured to the vehicle seat VS. This rigid body RB may be the Multimac available from Multimac of Birmingham, United Kingdom, B6 4NF and as described in European patent 0844938 (the entire contents of which are incorporated by reference) and which is shown in FIG. 9. In embodiments, however, other rigid bodies RB may be used.

The frame 3 is secured to the rigid body RB on the vehicle seat VS prior to use. The securement member 37 at the second end 34e of the base plate 34 is engaged within a slot in the rigid body RB. The second major surface 34b of the base plate 34 is supported by the rigid body RB such that the abutment 35 is abutted by a projection from the rigid body RB. In this way the frame is restricted from moving away from the seat back VSB of the vehicle seat VS. In this secured arrangement the base plate 34 is substantially parallel to the floor F of the vehicle in front of the vehicle seat VS. If needs be, the length of the leg 30 is then adjusted, by relatively rotating the support member 32 and the foot 33, to ensure that the foot 33 engages with the floor F in front of the vehicle seat VS.

In the first condition (as shown in FIG. 1), when a child C is seated in the child safety seat 1, the back of the child's head H is spaced from the seat back VSB of the vehicle seat VS upon which the child safety seat 1 is secured by a distance d which is less than 700 mm.

Figure 3:
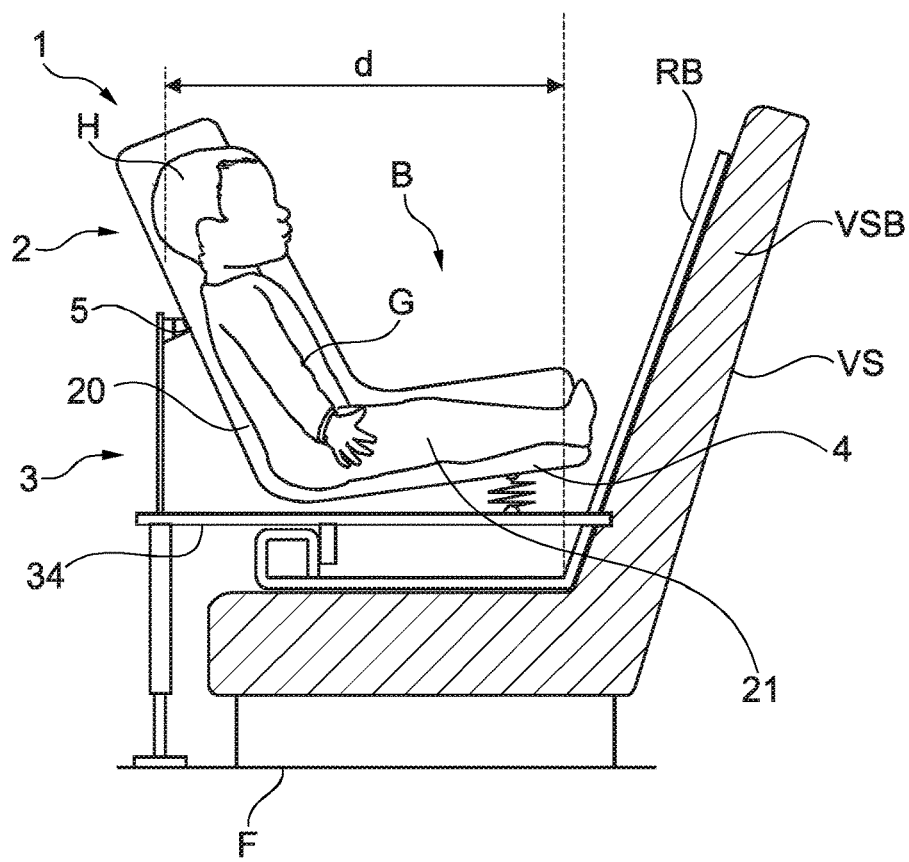
FIG. 3 is a sectional side view of the child safety seat shown in FIG. 1 shown in a second condition.

Referring now to FIG. 3, there is shown the child safety seat 1 shown in FIG. 1 in a second condition, which is a collapsed condition subsequent to the child safety seat 1 experiencing a vehicular accident. In this second condition the seat body 2 has partially rotated relative to the frame 3 and the vehicle seat VS (as indicated by arrow B), such that a terminal edge of the seat portion 21 is relatively nearer to the base plate 34 of the frame 3 than it was in the first, nominal, condition. The energy absorbing structure of the energy absorbing device 4 has partially collapsed in this second condition. Advantageously, the energy absorbing device 4 mitigates the quantity of energy transmitted to the child C occupying the child safety seat 1 during a vehicular accident causing the child safety seat 1 to move from the first condition to the second condition. Collapse of the energy absorbing device 4 consumes some of the energy generated in the vehicular accident, thereby reducing the amount of energy transmitted to the child C.

In the second condition the distance d' between the back of the child's head H and the seat back VSB of the vehicle seat VS onto which the child safety seat 1 is secured is less than 700 mm.

As will be appreciated, a vehicular accident causes the back portion of prior art rear-facing child safety seats to oscillate toward and away from the seat back of the vehicle seat upon which they are secured. During this oscillation the back of the head of a child occupant of a child safety seat moves relatively toward and away from the vehicle seat upon which the child safety seat is secured.

In tests, it has been surprisingly found that the distance d between the back of the head H of a dummy child occupant C of a child safety seat 1 according to the invention and the seat back VSB of the vehicle seat VS upon which the child safety seat 1 is secured does not exceed 700 mm during vehicular accidents, even when the child safety seat 1 is of sufficient dimensions to seat a dummy child of 3 years old, for example 4 years old.

Advantageously, child safety seats 1 according to the invention relatively reduce the distance by which the back of the head H of a child occupant C thereof moves during a vehicular accident, relative to prior art child safety seats. Therefore, the distance d remains less than 700 mm even during a vehicular accident.

Securing the back portion 20 of the seat body 2 relative to the vehicle seat VS, by way of the frame 3, ensures that the distance by which the head H of a child occupant C of the child safety seat 1 translates during vehicular accident is relatively reduced. Providing an attachment location between the back portion 20 of the seat body 2 and the frame 3 provides a restriction against lateral movement of the seat body 2 away from the seat back VSB of the vehicle seat VS upon which the child safety seat 1 is secured. Furthermore, provision of a hinge 5 attaching the back portion 20 of the seat body 2 to the frame 3 provides a pivot point about which the seat body 2 may, at least partially, rotate relative to the frame 3 during a vehicular accident. Importantly, the seat body 2 is therefore not entirely restricted from motion relative to the vehicle seat VS upon which it is secured, and, hence, the energy of impact during a vehicular accident is at least partially dissipated rather than being entirely transmitted to a child occupant C of the child safety seat 1.

It has been found to be particularly beneficial to provide the hinge 5 at a position which is above, in use, the centre of gravity of the seat body 2 and a child occupant C thereof. For example, the hinge is located such that only a minor portion of the back portion 20 extends beyond the hinge 5. Beneficially, that part of the back portion 20 configured to support the head H of a child occupant C moves by a relatively reduced distance away from the vehicle seat VS upon which the child safety seat 1 is secured, compared to the part of back portions of prior art child safety seats configured to support children's heads H, when subjected to a comparable external force (e.g. during a vehicular accident).

Without wishing to be bound by any particular theory, it is believed that positioning the pivot point provided by the hinge 5 above, in use, the centre of gravity G of the seat body 2 and a child occupant C thereof a moment generated on the seat body 2 above the hinge 5 will be relatively reduced (for a given applied force). Consequently, the seat body 2 according to the invention will rotate relative to the vehicle seat VS upon which the child safety seat 1 is secured by a relatively reduced angle of rotation than will a prior art child safety seat, for a given applied force.

Prior art child safety seats may secure the seat body to the vehicle seat VS at the seat portion of the seat body. Accordingly, when the seat body is subjected to a vehicular accident the seat body pivots relative to the vehicle seat VS about the join between the back portion and seat portion of the seat body. Accordingly, the radius of rotation of the seat body of such prior art child safety seats is equal to the distance by which the back portion extends from the seat portion. With child safety seats 1 according to the invention the radius of rotation of the seat body is relatively reduced and is equal to that part of the back portion 20 extending beyond the hinge 5. Therefore, for the same angle of rotation, the terminal edge of the back portion 20 according to the invention translates by a relatively reduced lateral distance from the seat back VSB of the vehicle seat VS upon which the child safety seat 1 is secured than does the terminal edge of the back portion of a prior art child safety seat. Indeed, and as explained above, the back portions 20 of child safety seats 1 according to the invention rotate by a relatively reduced angle of rotation for a given applied force than do the back portions of prior art child safety seats. Hence, lateral displacement of the back portion 20 (and hence the head H of a child occupant C thereof) relative to the seat back VSB of the vehicle seat VS is relatively reduced.

Moreover, provision of the hinge 5 for attaching the frame 3 to the seat body 2 allows the seat body 2 to move (e.g. partially rotate relative to the frame 3) during a vehicular accident. Beneficially, the proportion of energy from the vehicular accident transmitted to an occupant of the child safety seat 1 is therefore relatively reduced. Some energy is expended in moving (e.g. rotating) the seat body 2 relative to the frame 3. A further proportion of the energy of the vehicular accident is expended in crushing the energy absorbing device 4. Accordingly, the energy and hence forces applied to a child occupant C of the child safety seat 1 are therefore relatively reduced. Chest decelerations induced in the child occupant C of the child safety seat 1 are thereby relatively reduced. It has been found that child safety seats 1 according to the invention therefore generate chest decelerations less than the above-described 55 g limit.

A child safety seat 1 according to the invention may therefore be dimensioned to seat a child up to 3 or 4 years of age whilst complying with the test standards described above. Accordingly, parents may continue seating their children in child safety seats 1 according to the invention until they are relatively older than is possible with prior art child safety seats. Beneficially, the children are therefore better protected if a vehicular accident occurs.

Figure 4:
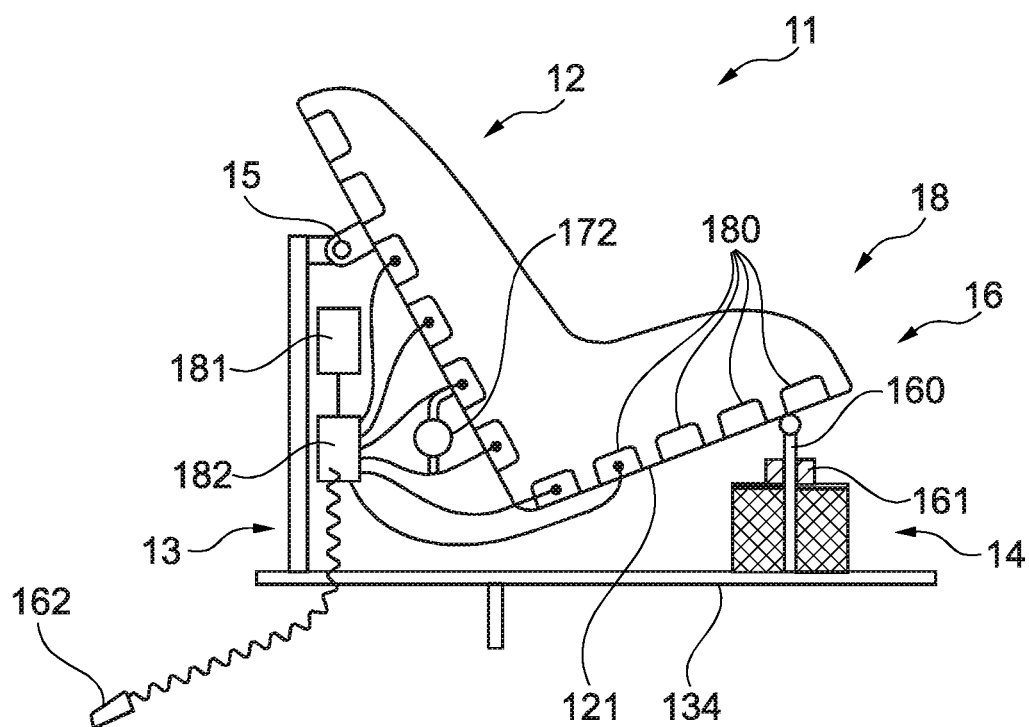
FIG. 4 is a partial sectional side view of a child safety seat according to a further embodiment of the invention.
Figure 5:
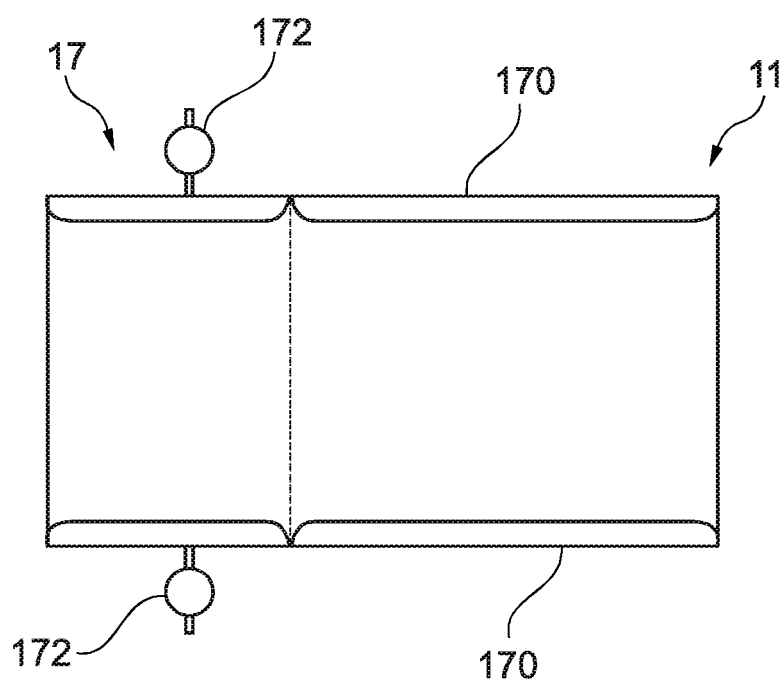
FIG. 5 is a plan view of the child safety seat shown in FIG. 4.
Figure 6:
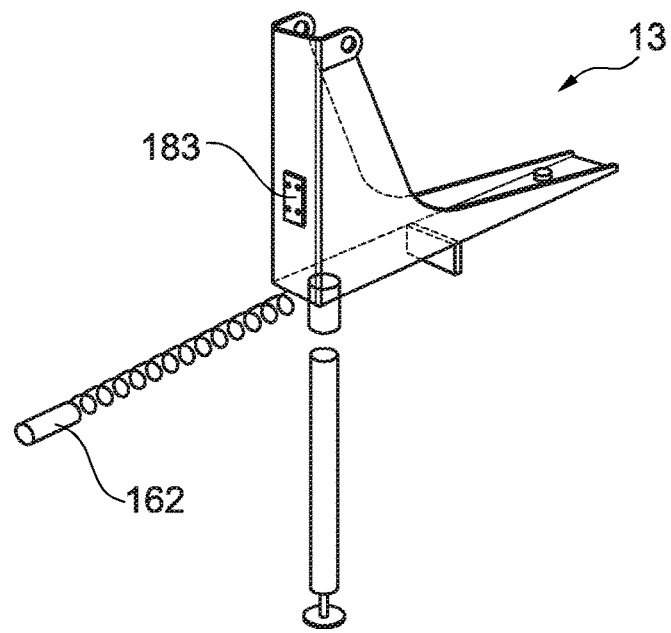
FIG. 6 is a perspective view of the frame of the child safety seat shown in FIG. 4.

Referring now to FIGS. 4, 5 and 6, there is shown a child safety seat 11 according to a further embodiment of the invention in which like features to those of the child safety seat 1 shown in FIG. 1 are denoted by like references preceded by a '1' which will not be described herein further. The child safety seat 11 shown in FIG. 4 differs from that shown in FIG. 1 in that the child safety seat 11 comprises size adjustment means or mechanisms comprising an angle adjustment mechanism 16, a width adjustment mechanism 17 and seat body profile adjustment mechanism 18.

The angle adjustment mechanism 16 is configured to adjust, e.g. relatively increase and/or decrease, the angle of the seat body 12 relative to the frame 13, for example the angle by which the seat portion 121 of the seat body 12 extends relative to the base plate 134 of the frame 13. Actuation of the angle adjustment mechanism 16 causes the seat body 12 to pivot about the hinge 15. Accordingly, the angle adjustment mechanism 16 functions in concert with the hinge 15 in order to adjust the angle of the seat body 12 relative to the frame 13.

The angle adjustment mechanism 16 comprises an engagement member 160 and a fixed member 161. The engagement member 16 is arranged to engage with the seat portion 121 of the seat body 12 whilst the fixed member 161 is attached or attachable to the base plate 134 of the frame 13. In use, the engagement member 160 is adjustable relative to the fixed member 161 such that the angle between the seat portion 121 of the seat body 12 and the base plate 134 of the frame 13 may be altered.

In this embodiment the engagement member 160 comprises a bolt 160, whilst the fixed member 161 comprises a nut 161. The free end of the bolt 160 is arranged to engage the seat portion 121 of the seat body 12. The nut 161 is rotatable by electrically powered driving means (not shown) which is connectable to a source of electricity via a lead. In embodiments the angle adjustment mechanism 16 may be manually adjustable. Electrical power is provided or providable through a cable having an electrical connection 162, which is a cigarette lighter plug 162 in this embodiment.

The angle adjustment mechanism 16 is located or locatable on (or integrated with) the energy absorbing device 14. Therefore, in the event of a vehicular accident, the energy absorbing device 14 still at least partially crumples, thereby absorbing some of the impact energy of the accident.

The angle adjustment mechanism 16 may be located at or adjacent the terminal edge of the seat portion 121. Advantageously, the force required to adjust the angle of the seat body 12 relative to the frame 13 is relatively reduced. Furthermore, adjustment of the angle of the seat body 12 relative to the frame 13 may be more precisely and smoothly controlled. In embodiments the angle adjustment mechanism 16 may be programmed and/or controlled to repeatedly adjust the angle of the seat body 12 relative to the frame 13. The angle adjustment mechanism 16 may therefore be used to gently rock a child occupant C of the child safety seat 11 backwards and forwards, for example to encourage that child C to fall asleep or to otherwise calm the child C.

Beneficially, the angle adjustment mechanism 16 allows the seat body 12 to be moved into a relatively more or less inclined position relative to the frame 13. As will be appreciated by one skilled in the art, babies require a relatively more inclined seat body (relative to horizontal) than do older children. Accordingly, the angle adjustment mechanism 16 allows the child safety seat 11 to be used by children across a range of ages up to 4 years old.

The width adjustment mechanism 17 comprises one or more side expandable members 170 disposed at or adjacent the opposed sides of the seat body 12, and on the inside surface thereof. The width adjustment mechanism 17 is arranged to be operable to alter the width of the seating space within the seat body 12.

Each of the side expandable members 170 is fluidly connected to a source of expansion fluid 171. In this embodiment the source of expansion fluid 171 is an air pump 171 which is manually powered. In embodiments, however the air pump 171 may be electrically driven and/or may provide a further expansion fluid in addition to or alternatively to air.

Beneficially, by relatively adjusting the width of the seating area in the seat body 12 the child safety seat 11 may be adjusted to fit children of different sizes and/or ages. Accordingly, the child safety seat 11 may therefore be used for a range of ages and/or sizes of children.

The seat body profile adjustment mechanism 18 comprises plural lateral expandable members 180 disposed on and/or across the central or seating surface of the seat body 12. In embodiments, only one lateral expandable member 180 may be provided.

The lateral expandable members 180 are fluidly connected to an electrically driven air pump 181 for expanding or contracting said members. The air pump 181 is electrically connected to a controller 182 which is programmed or programmable to relatively expand or contract one or more of the plural lateral expandable members 180, to thereby alter the profile of the seating space within the seat body 12. In embodiments, the air pump 181 may be manually operated and/or may provide a further expansion fluid in addition to or alternatively to air. In this embodiment, the controller 182 may be programmed or programmable through a control panel 183 (as shown in FIG. 6).

The controller 182 may be programmed or programmable to repeatedly expand and contract one or more of the lateral expandable members 180, for example to provide a massaging effect against a child occupant C of the child safety seat 11. Advantageously, a child occupant C of the child safety seat 11 may therefore be more readily encourage to fall asleep or to be otherwise calmed or placated.

It has been found that a combination of a rocking motion generated by the angle adjustment mechanism 14 and a massaging effect of the seat body profile adjustment mechanism 18 is particularly beneficial with regard to encouraging a child occupant C of the child safety seat 11 to fall asleep or to otherwise calm or placate said child.

Beneficially, expansion and/or contraction of one or more of the lateral expansion members 180 toward the terminal edges of the seat portion 121 and/or the back portion 120 of the seat body 12 may be used to alter the size of the seating area of the seat body 12. Accordingly, expansion and/or contraction of one or more of the lateral expansion members 180 beneficially allows the size of the seating area of the seat body 12 to be tailored to the size of the child C seated therein (or to be seated therein).

Advantageously, the size adjustment means or mechanisms allow the child safety seat 11 to be used by a range of ages and/or sizes of children. Therefore, the child safety seat 11 does not need to be replaced with sequentially larger child safety seats 11 as a child ages/grows (as is typically the practice with prior art child safety seats). Nor does the child safety seat 11 need to be replaced with a differently sized seat when a differently sized child is transported in the vehicle. This adjustability therefore provides a cost saving relative to the requirement of purchasing plural child safety seats 11 to accommodate differently sized children. It is also more convenient to not have to remove and install child safety seats 11 multiple times.

In embodiments, the side expandable members 170 and/or lateral expandable members 180 may be arranged to actuate upon detection of a collision to securely embrace the occupant. If the side expandable members 170 and/or lateral expandable members 180 are formed of fluid they will provide further cushioning to the occupant.

Figure 7:
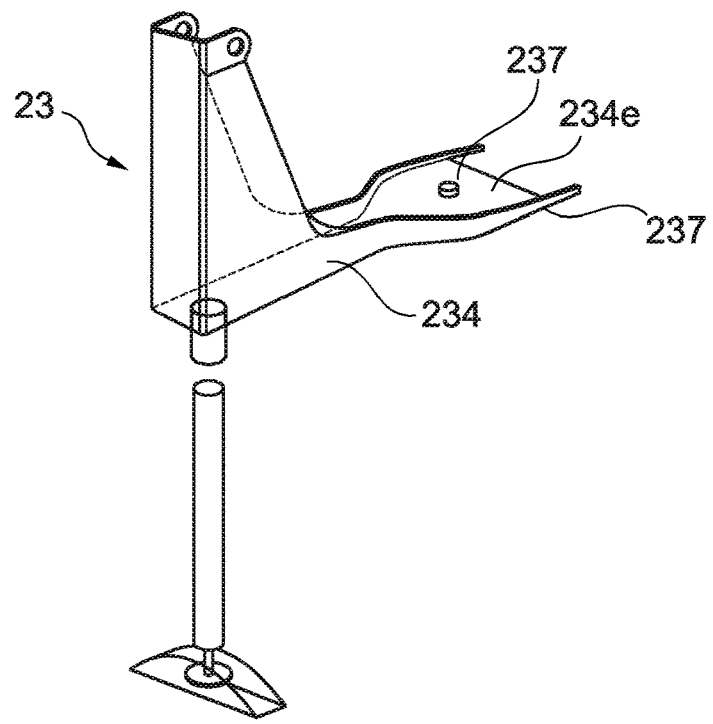
FIG. 7 is a perspective view of a frame according to a further embodiment of the invention.

Referring now to FIG. 7, there is shown a frame 23 for a child safety seat according to a further embodiment of the invention, wherein features similar to the frame 3 shown in FIGS. 1, 2 and 3 are denoted by like references preceded by a '2' and will not be described herein further. The frame 23 shown in FIG. 7 differs from that shown in FIGS. 1, 2 and 3 in that the securement member 237 extending from the second end 234e of the base plate 234 comprises the male portion 237 of an ISOFIX® mechanism (otherwise known as a UCSS mechanism or LATCH in the USA, or UAS, Canfix in Canada). In use, the male portion 237 of the ISOFIX mechanism is secured into the vehicle's ISOFIX slots, which comprise the female portion of the ISOFIX mechanism. The frame 23 may thereby be secured directly to a vehicle seat VS, absent the rigid body RB described above. In embodiments, however, the ISOFIX mechanism may be used in conjunction with the rigid body RB described above.

Figure 8:
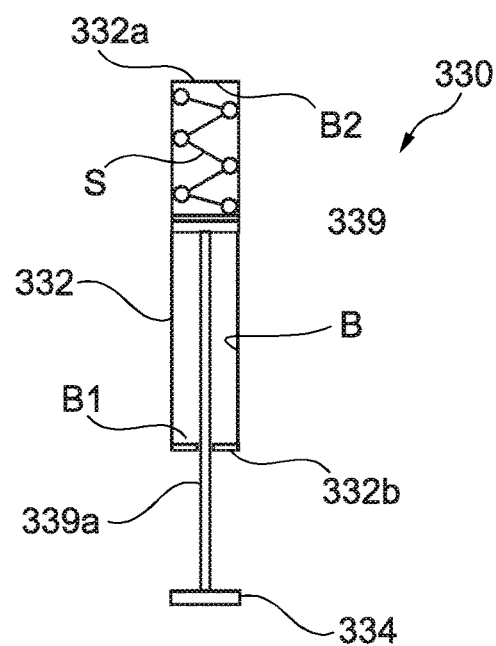
FIG. 8 is a sectional side view of a leg according to a further embodiment of the invention.

Referring now to FIG. 8 there is shown a leg 330 for a child safety seat according to a further embodiment of the invention, wherein features similar to the leg 30 shown in FIGS. 1, 2 and 3 are denoted by like references preceded by a '3' and will not be described herein further. The leg 330 shown in FIG. 8 differs from that shown in FIGS. 1, 2 and 3 in that the leg 330 comprises an alternative height adjustment mechanism.

The support member 332 is at least partially hollow, thereby defining an internal bore B along part or all of its length. The bore B has a first end B1 spaced from the second, support end 332b of the support member 332 and a second end B2 at the second, support end 332b of the support member 332.

The foot 333 is attached to a piston 339 by a connection rod 339a. The piston 339 is shaped and sized to slidably engage with the inner surfaces of the bore B, such that the piston 339 is movable along the bore B. A biaser S, which is a compression spring S in this embodiment, is disposed within the bore B at the first end B1 thereof. The piston 339 is disposed between the second end B2 of the bore B and the compression spring S. The bore B is filled with valving in this embodiment, which may comprise a liquid and/or a gas.

In use, the compression spring S is arranged to bias the piston 339 away from the first end 332a of the support member 332. Prior to installation in a vehicle the piston 339 is at least partially pushed toward the first end 332a of the support member 332, such that the foot 334 is moved adjacent the second end 332b of the support member 332. The foot 334 is retained in this position, either manually by the installer or by a catch or clip (not shown). The leg 330 is then attached to the support portion 331 and the frame 33 is secured to a vehicle seat VS, as described above. When in situ, and after the foot 334 has been released (e.g. after the installer has released the foot 334 and/or the catch or clip is removed), the spring S drives the piston 339 away from the first end 332a of the support member 332 and, hence, the foot 334 away from the second end 332b of the support member. In this way the length of the leg 330 is automatically adjusted until the foot 334 engages with the floor F in front of the vehicle seat VS upon which the child safety seat is secured.

Advantageously, the biaser S (and valving, where provided) acts as a secondary energy absorbing device during a vehicular accident, thereby further protecting a child occupant C of the child safety seat from experiencing excessive forces.

As will be appreciated, features of each of the above embodiments may be combined within a single child safety seat. For example, it is quite conceivable that any of the above-described features and/or the following features may be included in or with the first embodiment of the present invention: the male portion of an ISOFIX mechanism, an angle adjustment mechanism, a width adjustment mechanism, a seat body profile adjustment mechanism, a pump, a controller and a lead for electrical connection.

It will be appreciated by those skilled in the art that several variations to the aforementioned embodiments are envisaged without departing from the scope of the invention. For example, the frame may comprise the first hinge portion and the seat body may comprise the second hinge portion. Additionally or alternatively, the first and second hinge portions may take any suitable shape and configuration such that a hinge connection is provided or provideable between the seat body and the frame. Additionally or alternatively, the lateral expandable members and the side expandable members may be fluidly connected to the same pump, for example which may be manually or electrically operated. Additionally or alternatively, any of the above-described embodiments may comprise a heating system, for example comprising one or more heating elements. The one or more heating elements may be located or locatable in or on the seat body.

It will also be appreciated by those skilled in the art that any number of combinations of the aforementioned features and/or those shown in the appended drawings provide clear advantages over the prior art and are therefore within the scope of the invention described herein.

The invention claimed is:

1. A child safety seat for a vehicle, the child safety seat comprising a seat body and a frame which is removably secured to or securable onto an existing vehicle seat in a rearward configuration, the seat body comprising a back portion and a seat portion, the frame being pivotably attached to the back portion of the seat body, the back portion and the seat portion together providing an upholstered occupant-facing surface for receiving a child, and further comprising a size altering mechanism to alter a lateral dimension of the occupant-facing surface to allow accommodation of children of different sizes.

2. A child safety seat according to claim 1, wherein the child safety seat further comprises a control unit which is configured or configurable to control the size altering mechanism.

3. A child safety seat according to claim 2, wherein the control unit is programmed or programmable to control the size altering mechanism.

4. A child safety seat according to claim 1, wherein the size altering mechanism comprises one or more expandable bodies operable, in use, to alter the shape of the seat body.

5. A child safety seat according to claim 4, the child safety seat further comprising a control unit, and wherein the control unit is operable to control expansion and/or contraction of the, one, some or each expandable body.

6. A child safety seat according to claim 4, the child safety seat further comprising an expansion mechanism, wherein the expansion mechanism is operably connected to the one, some or each expandable body and wherein the expansion mechanism is operable to expand and/or collapse the one, some or each expandable body.

7. A child safety seat according to claim 6, wherein the expansion mechanism is an inflation mechanism, for example a pump such as an air pump.

8. A child safety seat according to claim 6, wherein the expansion mechanism is electrically driven or drivable or wherein the expansion mechanism is manually driven or drivable.

9. A child safety seat according to claim 4, wherein the occupant-facing surface comprises a seating area for seating a child, in use, and where the, one, some or each expandable body is expandable and/or contractible, in use, to alter the size of the seating area.

10. A child safety seat according to claim 9, wherein the, one, some or each of the one or more expandable bodies are expandable and/or contractible, in use, to alter the width, length and/or profile of the seating area.

11. A child safety seat according to claim 10, wherein the child safety seat comprises a controller, and wherein the controller is programmed or programmable to repeatedly expand and contract one, some or each of the one or more expandable bodies, for example to provide a massaging effect against an occupant of the child safety seat.

12. A child safety seat according to claim 1, further comprising an angle altering mechanism operable to alter the angle at which the seat portion of the seat body extends relative to the frame.

13. A child safety seat according to claim 12, wherein the angle altering mechanism comprises a displacement device configured or configurable to displace the seat body relative to the frame, in use.

14. A child safety seat according to claim 13 wherein the displacement device is configured or configurable to alter the angle of the seat body relative to the frame.

15. A child safety seat according to claim 13, wherein the displacement device is configured or configurable to alter the distance between a terminal edge of the seat portion of the seat body and the frame.

16. A child safety seat according to claim 13, wherein the displacement device is automatically operated or operable or wherein the displacement device is manually operated or operable.

17. A child safety seat according to claim 12, comprising a programmer and/or a controller to repeatedly alter the angle of the seat body relative to the frame, for example to rock an occupant of the child safety seat backwards and forwards.

18. A child safety seat according to claim 1, comprising a heating system.

19. A child safety seat according to claim 1, engaged with and secured to a child seat for a vehicle and for receiving plural children.

20. A child safety seat for a vehicle, the child safety seat comprising a seat body and a frame which is removably secured to or securable onto an existing vehicle seat in a rearward configuration, the seat body comprising a back portion and a seat portion, the frame being pivotably attached to the back portion of the seat body, the back portion and the seat portion together providing an upholstered occupant-facing surface for receiving a child, and further comprising an angle altering mechanism operable to alter the angle at which the seat portion of the seat body extends relative to the frame and a programmer or controller operable to adjust the angle altering mechanism to alter the angle at which the seat portion of the seat body extends relative to the frame.

* * * * *